Patented June 5, 1934

1,961,590

UNITED STATES PATENT OFFICE 1,961,590

CONCENTRATION OF SODIUM HYDROXIDE

Robert B. MacMullin, Niagara Falls, N. Y., assignor to The Mathieson Alkali Works, Inc., New York, N. Y., a corporation of Virginia No Drawing. Application September 19, 1932, Serial No. 633,854

7 Claims. (Cl. 23—184)

This invention relates to improvements in the concentration of sodium hydroxide. More particularly, the invention relates to improvements in the production of concentrated aqueous solutions of sodium hydroxide.

It has been known for some time that sodium hydroxide monohydrate, $NaOH \cdot H_2O$, can be precipitated from aqueous solutions of sodium hydroxide initially containing upwards of 20% by weight NaOH at temperatures ranging from below 0° C. to over 35° C. by the addition of ammonia. Separation of sodium hydroxide monohydrate so precipitated, however, involves technical difficulties because of the ammonia concentrations necessary to effect the precipitation. This separation of a solid from a liquid must be effected, for example, either at low temperature or under substantial pressure.

I have discovered that with the addition of ammonia to aqueous solutions of sodium hydroxide initially containing upwards of 20% NaOH a separation of the solution into two liquid layers the lower of which contains sodium hydroxide in higher concentration than the original solution can be effected at temperatures higher than those at which sodium hydroxide monohydrate is precipitated. This discovery enables me to effect the separation of the more concentrated aqueous solution of sodium hydroxide constituting the lower liquid layer as a separation of one liquid from another liquid and thus to avoid such technical difficulties.

According to my invention, ammonia is added to aqueous solutions of sodium hydroxide containing upwards of 20% NaOH and the solution, to which ammonia has been added, is separated into two liquid layers the lower of which contains sodium hydroxide in higher concentration than the original solution at an elevated temperature. Temperatures as low as 35° C. are useful, in some cases, but in general I find the range of 50°-70° C. advantageous. I find a temperature approximating 60° C. to be particularly advantageous. At temperatures approximating 60° C., distinct differences in density promoting rapid and definite separation of the two liquid layers are developed, and without the development of excessive pressures. The ammonia may be added to the aqueous solution of sodium hydroxide at low temperature and the solution then heated to the temperature at which separation is effected or the ammonia may be added to the solution at the elevated temperature at which the separation is effected.

The lower liquid layer contains sodium hydroxide in higher concentration than the original solution and also contains some dissolved ammonia. Following segregation of the two liquid layers separated in the practice of my invention, this lower liquid layer can be purged of ammonia by reduction of pressure and heating or in some cases by reduction of pressure alone. The upper liquid layer contains some sodium hydroxide and most of the ammonia. Following segregation of the two liquid layers, this ammonia can be recovered in substantially anhydrous form by distillation therefrom with concurrent production of a relatively dilute aqueous solution of sodium hydroxide. Or, after segregation of the two liquid layers, sodium hydroxide monohydrate may be precipitated from the upper liquid layer by chilling and the sodium hydroxide monohydrate thus separated added to the segregated lower liquid layer further to increase the concentration of sodium hydroxide therein.

My invention is not limited in application to pure solutions of sodium hydroxide but is also applicable to other aqueous solutions containing sodium hydroxide in concentrations upwards of 20% NaOH. In some cases, it is advantageous to add water soluble salts compatible with sodium hydroxide to increase the efficiency of the operation. Sodium nitrate may be so added to the solution to which my invention is to be applied.

When sodium nitrate is added to the aqueous solution of sodium hydroxide prior to the separation of the two liquid layers, in carrying out my invention, the sodium hydroxide concentrates in the lower liquid layer and the sodium nitrate concentrates in the upper liquid layer. The sodium nitrate content of the upper liquid layer can be recovered, after segregation of the two liquid layers, for example, by subjecting the upper liquid layer to the action of carbon dioxide to produce sodium carbamate, $NaCO_2NH_2$, and ammonium nitrate or by crystallization following evaporative concentration. The small proportion of sodium nitrate accompanying the concentrated sodium hydroxide in the lower liquid layer, if objectionable, can be separated therefrom during subsequent evaporation as sodium carbonate, sodium sulphate and sodium chloride are conventionally separated during evaporative concentration of caustic soda liquors. For the ultimate production of fused anhydrous sodium hydroxide, the presence of such relatively small proportions of sodium nitrate is advantageous, rendering unnecessary the conventional addition of sodium nitrate for purification of the fused product.

In general, sodium salts which are relatively soluble in both water and liquid ammonia and which are relatively insoluble in concentrated aqueous solutions of sodium hydroxide can be added, with advantage, to the solution to which my invention is to be applied. For example, one or more of the salts sodium iodide, sodium cyanate and sodium thiocyanate, as well as sodium nitrate, may be added to the aqueous solution of sodium hydroxide prior to the separation of the two liquid layers.

The following examples will further illustrate my invention:

Example I 200 parts (by weight) of anhydrous ammonia are added to 100 parts of an aqueous solution of sodium hydroxide containing 25% by weight NaOH. The mixture is brought to a temperature of 60° C., briefly stirred and permitted to settle. Two liquid layers separate and are segregated by decantation. After separation of ammonia, by distillation, the lower layer consists of an aqueous solution of sodium hydroxide containing about 50% by weight NaOH and the upper layer consists of an aqueous solution of sodium hydroxide containing about 19% by weight NaOH. The recovered ammonia may be reused in the operation.

Example II 125 parts of anhydrous ammonia are added to 100 parts of an aqueous solution of sodium hydroxide containing 30% by weight NaOH. The mixture is brought to a temperature of 60° C., briefly stirred and permitted to settle. Two liquid layers separate and are segregated by decantation. After separation of ammonia, by distillation, the lower layer consists of an aqueous solution of sodium hydroxide containing about 47% by weight NaOH and the upper layer consists of an aqeous solution of sodium hydroxide containing about 21% by weight NaOH.

Example III 150 parts of anhydrous ammonia and 30 parts of sodium nitrate are added to 100 parts of an aqueous solution of sodium hydroxide containing 30% by weight NaOH. The sodium nitrate may be supplied in solution with the ammonia. The mixture is brought to a temperature of 60° C., briefly stirred and permitted to settle. Two liquid layers separate and are segregated by decantation. After separation of ammonia, by distillation, the lower layer consists of an aqueous solution of sodium hydroxide containing about 75% of the total sodium hydroxide and about 10% of the total sodium nitrate in the form of an aqueous solution of sodium hydroxide and sodium nitrate containing more than 50% by weight NaOH.

It will be understood that the separation and segregation of the two liquid layers, in carrying out my invention, is effected under a superatmospheric pressure, for example, of 75–300 pounds per square inch, in order to maintain the ammonia concentration in the reaction mixture. The concentrated aqueous solutions of sodium hydroxide produced by my invention, separated as the lower liquid layer, may be used as such or, for example, they may be subjected to further operations for further concentration. These concentrated solutions may be evaporated for the ultimate production of fused anhydrous sodium hydroxide or sodium hydroxide monohydrate may be precipitated from these solutions by chilling. Similarly, the relatively dilute solutions of sodium hydroxide produced in the practice of my invention, separated as the upper liquid layer, may be used as such or they may be subjected to further treatment for the recovery of contained sodium hydroxide, and any contained salts such as sodium nitrate.

My invention can be embodied in various combined operations involving, as one step, the concentration of aqueous solutions of sodium hydroxide. For example, an operation of the type illustrated by Example III can be embodied in a combined operation for the production of aqueous solutions of sodium hydroxide containing upwards of 50% NaOH as follows:

Ammonia and sodium nitrate are added to an aqueous solution of sodium hydroxide containing upwards of 20% by weight NaOH, this mixture is separated into two liquid layers and the two liquid layers are segregated, as in Example III. The upper liquid layer is carbonated to precipitate sodium carbamate, for example as described in an application filed June 4, 1932, Serial Number 615,464, by Wesley K. McCready and me. The precipitated sodium carbamate is separated from the liquor, by filtration for example, and is then causticized with lime in the presence of water to produce an aqueous solution of sodium hydroxide containing upwards of 20% NaOH which is supplied to the first-mentioned step. The liquor from which the sodium carbamate has been separated is stripped of ammonia, by distillation, for example, and is then treated with sodium chloride to convert the ammonium nitrate content of this liquor to sodium nitrate with precipitation of ammonium chloride. After separation of the precipitated ammonium chloride, by filtration for example, this sodium nitrate solution is supplied to the first-mentioned step directly, or it may be supplied to that step indirectly by being supplied to the causticization of the sodium carbamate with lime. The lower liquid layer is stripped of ammonia, by distillation for example, and then constitutes the product of the operation, the concentrated aqueous solution of sodium hydroxide. The ammonia recovered in each of the two stripping operations mentioned is returned to the first-mentioned step.

I claim:

1. In the production of concentrated aqueous solutions of sodium hydroxide, the improvement which comprises adding ammonia to an aqueous solution of sodium hydroxide containing upwards of 20% by weight NaOH and separating the solution into two liquid layers the lower of which contains sodium hydroxide in higher concentration than the original solution at a temperature upwards of 35° C.

2. In the production of concentrated aqueous solutions of sodium hydroxide, the improvement which comprises adding ammonia to an aqueous solution of sodium hydroxide containing upwards of 20% by weight NaOH and separating the solution into two liquid layers the lower of which contains sodium hydroxide in higher concentration than the original solution at a temperature of 50°–70° C.

3. In the production of concentrated aqueous solutions of sodium hydroxide, the improvement which comprises adding ammonia to an aqueous solution of sodium hydroxide containing upwards of 20% by weight NaOH and separating the solution into two liquid layers the lower of which contains sodium hydroxide in higher concentration than the original solution at a temperature approximating 60° C.

4. In the production of concentrated aqueous solutions of sodium hydroxide, the improvement which comprises adding ammonia to an aqueous solution of sodium hydroxide containing upwards of 20% by weight NaOH and separating the solution into two liquid layers the lower of which contains sodium hydroxide in higher concentration than the original solution at a temperature higher than that at which sodium hydroxide monohydrate is precipitated.

5. In the production of concentrated aqueous solutions of sodium hydroxide, the improvement which comprises adding ammonia to an aqueous solution of sodium hydroxide containing upwards of 20% by weight NaOH and separating the solution into two liquid layers the lower of which contains sodium hydroxide in higher concentration than the original solution at a temperature higher than that at which sodium hydroxide monohydrate is precipitated, and purging the lower liquid layer of ammonia after segregation from the upper liquid layer.

6. In the production of concentrated aqueous solutions of sodium hydroxide, the improvement which comprises adding ammonia to an aqueous solution of sodium hydroxide containing upwards of 20% by weight NaOH and separating the solution in the presence of a sodium salt relatively soluble in both water and liquid ammonia and relatively insoluble in concentrated aqueous solutions of sodium hydroxide into two liquid layers the lower of which contains sodium hydroxide in higher concentration than the original solution at a temperature higher than that at which sodium hydroxide monohydrate is precipitated.

7. In the production of concentrated aqueous solutions of sodium hydroxide, the improvement which comprises adding ammonia to an aqueous solution of sodium hydroxide containing upwards of 20% by weight NaOH and separating the solution in the presence of a sodium salt relatively soluble in both water and liquid ammonia and relatively insoluble in concentrated aqueous solutions of sodium hydroxide into two liquid layers the lower of which contains sodium hydroxide in higher concentration than the original solution at a temperature upwards of 35° C.

ROBERT B. MacMULLIN.